United States Patent
Kaur et al.

(10) Patent No.: US 10,762,340 B2
(45) Date of Patent: Sep. 1, 2020

(54) REAL-TIME GESTURE DETECTION AND RECOGNITION

(71) Applicant: Accenture Global Solutions Limited, Dublin (IE)

(72) Inventors: Ramandeep Kaur, Haryana (IN); Gagandeep Singh, New Delhi (IN); Jitender Saini, Roorkee (IN); Shefali Agarwal, Haryana (IN); Tarandeep Singh Chandhok, New Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 78 days.

(21) Appl. No.: 16/200,198

(22) Filed: Nov. 26, 2018

(65) Prior Publication Data
US 2020/0167556 A1 May 28, 2020

(51) Int. Cl.
*G06K 9/00* (2006.01)
*G06K 9/46* (2006.01)
(Continued)

(52) U.S. Cl.
CPC ......... *G06K 9/00355* (2013.01); *G06F 3/017* (2013.01); *G06K 9/38* (2013.01); *G06K 9/4609* (2013.01); *G06N 20/00* (2019.01)

(58) Field of Classification Search
CPC .... G06F 3/011; G06F 3/0304; G06F 16/2264; G06F 16/9024; G06F 3/0346; A63F 13/213; A63F 13/24; A63F 13/426; A63F 13/428; A63F 13/655; A63F 13/00; G06T 7/73; G06K 9/00771; G06K 9/6202; G06K 9/00221; G06K 9/00335; G06K 9/00369; G06K 9/627; G06K 9/00718;
(Continued)

(56) References Cited

U.S. PATENT DOCUMENTS 9,230,160 B1 1/2016 Kanter
2003/0156756 A1 8/2003 Gokturk et al.
(Continued)

OTHER PUBLICATIONS

Partial European Search Report for Application No. EP19208218.8, dated Jan. 7, 2020, 29 pages.
(Continued)

*Primary Examiner* — Duy M Dang
(74) *Attorney, Agent, or Firm* — Harrity & Harrity, LLP

(57) ABSTRACT

A device receives, as part of a gesture translation service, data that depicts gestures, wherein the data is image data or multimedia data. The device converts a set of frames that include the data to another set of frames that include modified data identifying a grayscale or black and white depiction of the gestures and generates graphical representations of the gestures identified by the modified data. The device selects, using a matching technique, a graphical representation of corresponding gestures that matches or satisfies a threshold level of similarity with the graphical representations of the gestures identified by the modified data. The device identifies response data that is representative of the corresponding gestures based on the response data being stored in association with an identifier of the graphical representation that has been selected. The device provides the response data to be displayed, via an interface, as text data or audio data.

20 Claims, 8 Drawing Sheets

(51) Int. Cl.
*G06F 3/01* (2006.01)
*G06K 9/38* (2006.01)
*G06N 20/00* (2019.01)

(58) Field of Classification Search
CPC .... G06K 9/6256; G06K 9/62; G06K 2209/21; G06K 9/00778; G06K 9/00993; G06K 9/03; G06N 3/04; G06N 3/08; G06N 3/02; H04N 7/181; H04N 5/2226; G08C 17/00; G08C 17/02; G05D 1/0033; G05D 1/0038; G05D 1/0044; G05D 1/0231; G05D 1/0214; G05D 1/0212; G08G 1/0968; G01C 21/3626; G06Q 30/0281; B60T 2210/00; B60T 2210/30; B60T 2210/32; A61B 2034/2065; B64C 39/024; B64C 2201/00; G08B 13/196; G08B 13/19608; G08B 13/19606
See application file for complete search history.

(56) References Cited

U.S. PATENT DOCUMENTS

| | | | |
|---|---|---|---|
| 2009/0324008 | A1 | 12/2009 | Kongqiao et al. |
| 2011/0149115 | A1 | 6/2011 | Cheng |
| 2015/0138063 | A1* | 5/2015 | Cao .................. G06F 3/011 345/156 |
| 2015/0370407 | A1* | 12/2015 | Beguin ............. G06F 3/0416 345/173 |
| 2016/0042228 | A1 | 2/2016 | Opalka et al. |

OTHER PUBLICATIONS

MotionSavvy Inc. "Introducing UNI: The World's first real time translation technology that converts sign language to grammatically correct spoken language", http://www.motionsavvy.com/uni.html, Jun. 25, 2018, 8 pages.

Leibs, Andrew. "iCommunicator App Translates Speech Into Text or Sign Language", http://www.lifewire.com/icommunicator-translates-speech-text-sign-language-198916?print, Jun. 25, 2018, 3 pages.

Migne, Julia. "Hand Talk: Revolutionary app for the deaf", https://the-inkline.com/2017/04/21/hand-talk-groundbreaking-app-for-the-deaf-community/, Apr. 21, 2017, 8 pages.

Reynolds, Matt. "Automatic sign language translators turn signing into text". https://www.newscientist.com/article/2133451-automatic-sign-language-translators-turn-signing-into-text/ Jun. 2, 2017, 3 pages.

Rogers, Kaleigh. "Augmented Reality App Can Translate Sign Language Into Spoken English, and Vice Versa". https://motherboard.vice.com/en_us/article/zmgnd9/app-to-translate-sign-language, Mar. 27, 2018, 16 pages.

Extended European Search Report for Application No. EP19208218.8, dated Jun. 23, 2020, 17 pages.

* cited by examiner

US 10,762,340 B2

REAL-TIME GESTURE DETECTION AND RECOGNITION

BACKGROUND

A sign language is a language that uses a visual-manual modality to convey meaning. For example, an individual may communicate using a sign language by using gestures to create signs that convey particular meaning.

SUMMARY

According to some implementations, a method may include receiving data that depicts one or more gestures. The data may be image data or multimedia data. The method may include filtering a first set of frames. The first set of frames may include the data. The filtering may be performed by using a technique to reduce image detail from the first set of frames. The method may include converting the first set of frames to a second set of frames that include modified data. The modified data identifies a grayscale or black and white depiction of the one or more gestures. The method may include generating one or more graphical representations of the one or more gestures identified by the modified data, and selecting, by using a matching technique, a graphical representation of one or more corresponding gestures. The graphical representation of the one or more corresponding gestures may match or satisfy a threshold level of similarity with the one or more graphical representations of the one or more gestures identified by the modified data. The method may include identifying response data that is representative of the one or more corresponding gestures. The identifying may be performed based on the response data being stored in association with the graphical representation that has been selected, or an identifier for the graphical representation that has been selected. The method may include causing the response data to be presented in a text format or an audio format.

According to some implementations, a device may include one or more memories, and one or more processors operatively coupled to the one or more memories, to receive a request associated with a gesture translation service. The request may include text data that describes one or more gestures, or image data or multimedia data that depict the one or more gestures. The one or more processors may determine whether the gesture translation service is a first type of gesture translation service or a second type of gesture translation service based on information included in the request. The first type of gesture translation service may involve translating the text data to an image or multimedia format and the second type of gesture translation service may involve translating the image data or the multimedia data to a text format. The one or more processors may determine whether to perform a set of filtering and/or conversion techniques based on whether the gesture translation service is the second type of gesture translation service. The set of filtering and/or conversion techniques, when performed, may cause a set of frames to be created that include modified image data identifying a grayscale or black and white depiction of the one or more gestures and cause one or more graphical representations of the one or more gestures identified by the modified image data to be generated. The one or more processors may determine whether to perform a first matching technique or a second matching technique based on whether the gesture translation service is the first type of gesture translation service or the second type of gesture translation service. The one or more processors may select, using the first matching technique or the second matching technique, a first identifier based on determining to perform the first matching technique or a second identifier based on determining to perform the second matching technique. The first identifier may be associated with particular text data that describes one or more corresponding gestures. The second identifier may be associated with a graphical representation of the one or more corresponding gestures. The one or more processors may identify response data using the first identifier or the second identifier. The response data may be stored in association with the first identifier and may be particular image data or particular multimedia data that depicts the one or more corresponding gestures, or may be stored in association with the second identifier and may be the particular text data that describes the one or more corresponding gestures. The one or more processors may cause the response data to be displayed via an interface.

According to some implementations, a non-transitory computer-readable medium may store one or more instructions that, when executed by one or more processors of a device, cause the one or more processors to receive, as part of a gesture translation service, data that depicts one or more gestures. The data may be image data or multimedia data. The one or more instructions may cause the one or more processors to convert a first set of frames to a second set of frames that include modified data identifying a grayscale or black and white depiction of the one or more gestures. The one or more instructions may cause the one or more processors to generate one or more graphical representations of the one or more gestures identified by the modified data. The one or more instructions may cause the one or more processors to select, using a matching technique, a graphical representation of one or more corresponding gestures. The graphical representation of the one or more corresponding gestures may match or satisfy a threshold level of similarity with the one or more graphical representations of the one or more gestures identified by the modified data. The one or more instructions may cause the one or more processors to identify response data that is representative of the one or more corresponding gestures based on the response data being stored in association with the graphical representation that has been selected or an identifier for the graphical representation that has been selected. The one or more instructions may cause the one or more processors to provide the response data that is representative of the one or more corresponding gestures to be displayed via an interface. The response data may be displayed as text data or audio data.

DETAILED DESCRIPTION

Figure 1A:
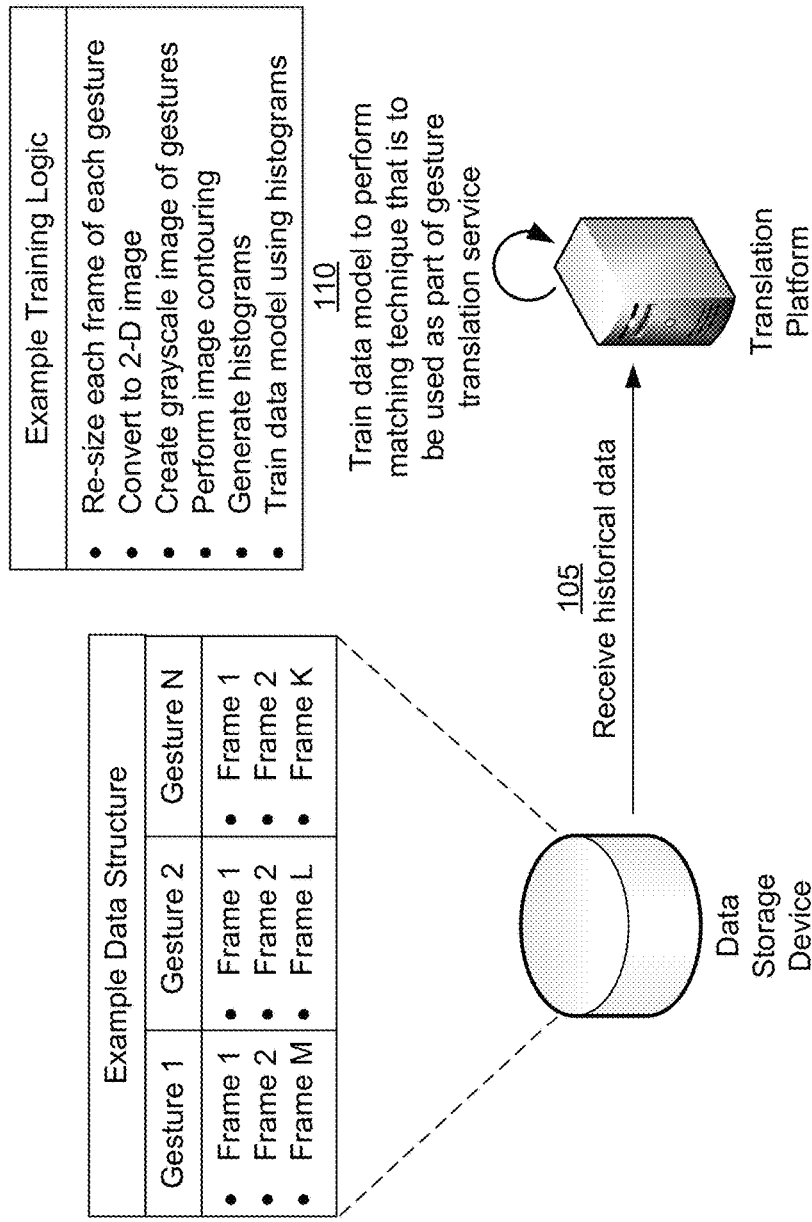
FIGS. 1A-1C are diagrams of an example implementation described herein.

The following detailed description of example implementations refers to the accompanying drawings. The same reference numbers in different drawings may identify the same or similar elements.

A sign language is a language in which communication is by way of gestures. For example, a first individual may communicate with a second individual using a sign language by making gestures (e.g., hand gestures) to the second individual, whereby the second individual understands a meaning conveyed by those gestures. Sign language is extremely important because it is a primary mode of communication for individuals with impaired speech, impaired hearing, and/or the like.

However, many sign languages are difficult to learn, and an individual who does not communicate in a sign language may be unable to effectively communicate with an individual who relies on the sign language as a primary mode of communication. Additionally, an interpreter may be difficult to find as there are far more individuals who rely on sign language as a primary mode of communication than interpreters. For example, there are approximately 300 certified sign language interpreters in India and hundreds of thousands of individuals who rely on sign language as their primary mode of communication. Furthermore, some translation services require specialized hardware (e.g., sensory gloves, etc.) that are not available or affordable to all individuals. Moreover, the translation services that utilize specialized hardware may not support multi-language translation. For example, a first individual who understands a sign language (e.g., American Sign Language (ASL)) may be able to communicate with a second individual in a first written or spoken language (e.g., English) but may be unable to communicate with the second individual in other written or spoken languages (e.g., Hindi, Spanish, and/or the like).

Some implementations described herein include a translation platform that provides a user device with a gesture translation service that supports multi-language, bi-directional translation to and/or from a sign language, without requiring the user device to utilize or interact with specialized hardware. For example, the translation platform may receive, from the user device, a request for the gesture translation service. The request may include image data that depicts one or more gestures and that is part of a first set of frames. In this case, the translation platform may modify the image data (e.g., by lowering a resolution of pixels) and may generate a second set of frames that includes a grayscale or black and white depiction of the one or more gestures identified by the modified image data.

Additionally, the translation platform may generate one or more graphical representations (e.g., histograms, etc.) of the one or more gestures identified within the second set of frames and may use machine learning to select a graphical representation of one or more corresponding gestures (e.g., that match or satisfy a threshold level of similarity with the one or more graphical representations of the one or more gestures). Furthermore, the graphical representation of the one or more corresponding gestures may be stored in association with text that describes a meaning conveyed by the one or more corresponding gestures (or with an identifier of the text). This may allow the translation platform to identify and provide the text for display on an interface of the user device. In some cases, the text may convey a meaning of the one or more corresponding gestures in multiple languages. Additionally, or alternatively, the translation platform may provide the user device with a text-to-image translation (e.g., to allow an individual to view an image of a particular sign in the sign language), as described further herein.

By providing real-time translation of gestures (e.g., gestures depicting signs), the translation platform allows individuals who do not understand sign language to communicate with individuals who rely on the sign language as a primary mode of communication. Moreover, by supporting a multi-language gesture translation service, the translation platform allows individuals to communicate using a number of different sign languages (e.g., ASL, Indian Sign Language (ISL), etc.) and/or written or spoken languages (e.g., Hindi, English, Spanish, etc.). Furthermore, using the translation platform to provide the user device with translations eliminates a need for specialty hardware (e.g., sensory gloves, a customized tablet, etc.), thereby allowing any individual with a computer or a phone (e.g., a smart phone) to utilize the gesture translation service.

Additionally, the translation platform provides the gesture translation service in a way that efficiently and effectively utilizes resources (e.g., processing resources, network resources, and/or the like). For example, by modifying images in a manner that reduces image detail (e.g., resolution, color, etc.) and generating graphical representations based on the images that have been modified, the translation platform conserves resources relative to a solution that has to process three-dimensional (3-D) images and/or two-dimensional (2-D) images that do not have reduced image detail.

Figure 1B:
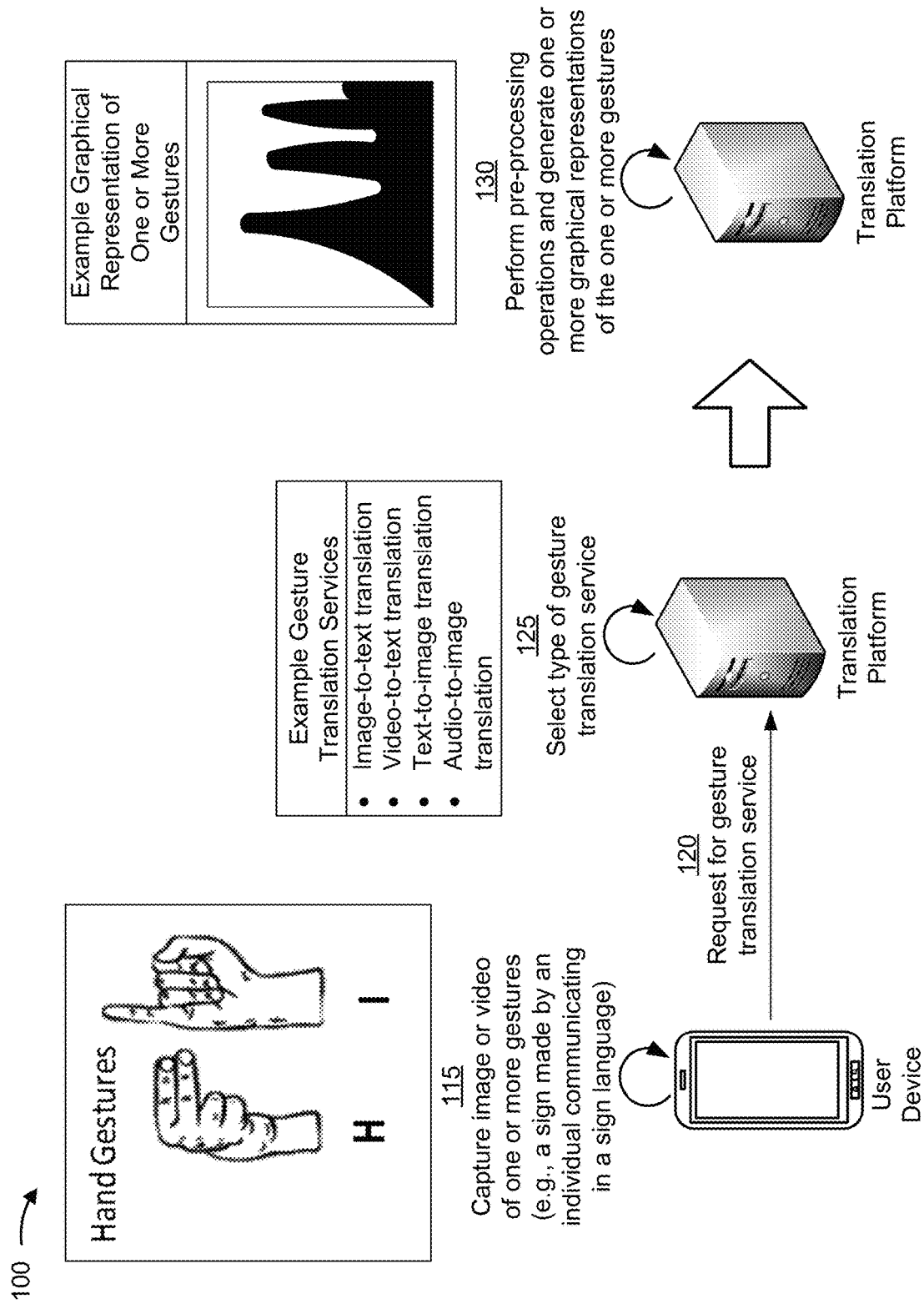
Figure 1C:
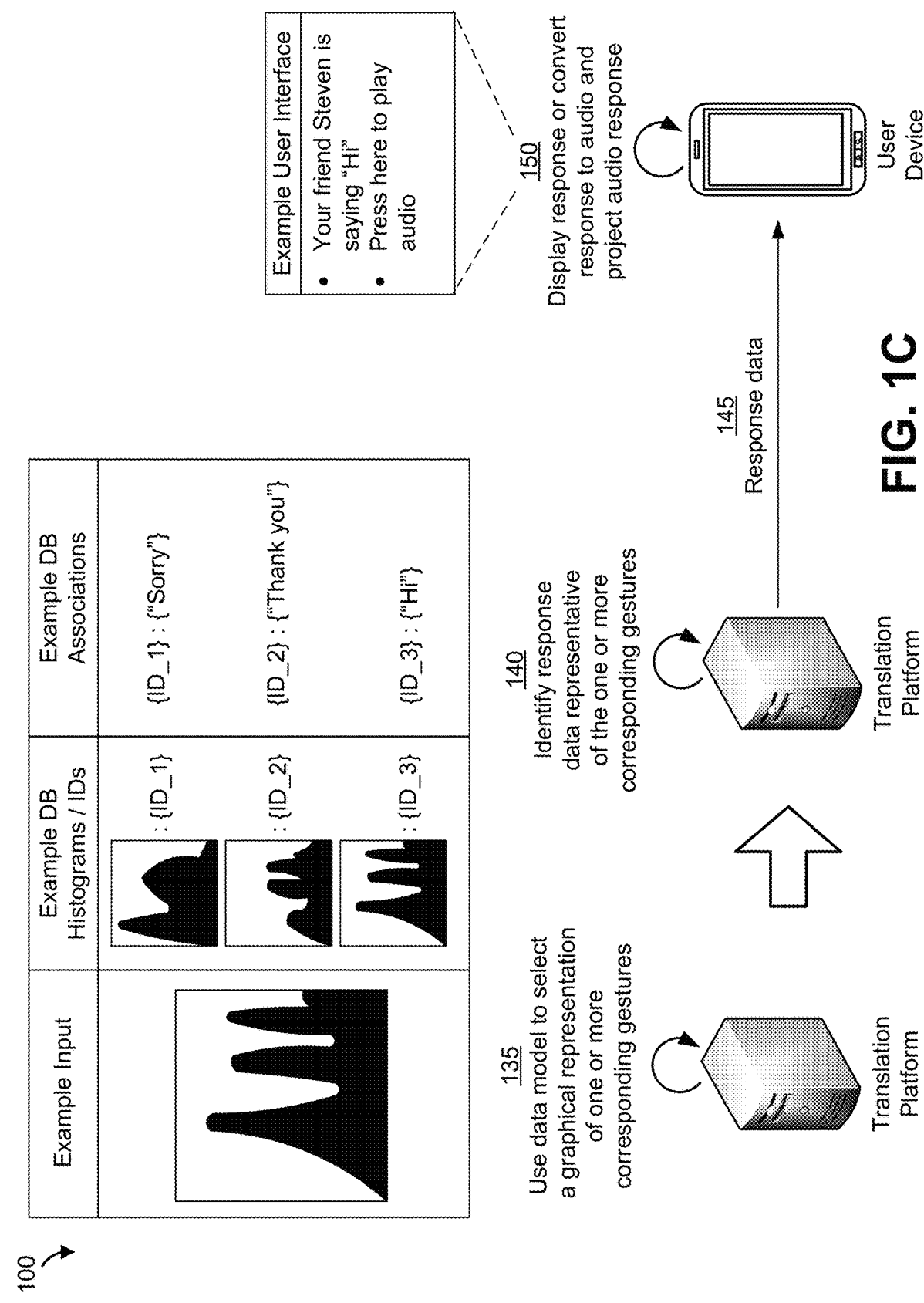

FIGS. 1A-1C are diagrams of an example implementation 100 described herein. Example implementation 100 may include a data storage device, a translation platform, and a user device. As shown in FIGS. 1A-1C, the translation platform may provide a gesture translation service that identifies and recognizes a meaning conveyed by one or more gestures.

As shown in FIG. 1A, the translation platform may train a data model to perform a matching technique. For example, the gesture translation service may translate to and/or from a sign language, and the translation platform may train a data model to analyze gestures and to identify and recognize the meaning conveyed by those gestures, as described in detail further herein.

As shown by reference number 105, the translation platform may receive historical data that is to be used to train the data model. For example, the translation platform may provide the data storage device with a request for historical data which may cause the data storage device to provide the translation platform with the historical data. Additionally, or alternatively, the data storage device may provide the historical data to the translation platform (e.g., periodically, based on a trigger or rule, and/or the like).

The historical data may include image data and/or multimedia data depicting a set of gestures associated with a sign language, text data and/or audio data describing a meaning conveyed by the set of gestures, and/or the like. For example, the image data and/or the multimedia data may include one or more sets of frames depicting a set of gestures used for one or more sign languages. A set of frames may capture variations of a gesture and may include one or more frames that capture the gesture at different camera angles, one or more frames that capture different physical variations of the gesture (e.g., different individuals may make slightly different hand motions when making a sign), one or more frames that capture the gesture with different levels of image detail (e.g., different resolution, different colors, etc.), one or more frames that capture the gesture with different types of hands (e.g., large/small, young/old, male/female, different skin tones, etc.), and/or the like. In some cases, the historical data may include data from translation dictionaries that identify associations between data depicting the set of gestures (e.g., the image data, the multimedia data, etc.) and data describing the meaning conveyed by the set of gestures (e.g., the text data, the audio data, etc.).

As shown by reference number 110, the translation platform may train the data model to perform the matching technique that is to be used as part of the gesture translation service. For example, the translation platform may perform a set of pre-processing operations on the data depicting the set of gestures, may generate a set of graphical representations (e.g., histograms) of the set of gestures, may use a data structure to associate the set of graphical representations with text describing a meaning conveyed by the set of gestures, and may train the data model to perform the matching technique (e.g., by referencing the data structure) when providing the gesture translation service, as each described further herein.

While one or more implementations described below refer to pre-processing operations being performed on or in relation to one item (e.g., one image, one frame, one gesture, etc.), it is to be understood that these are provided by way of example. In practice, the set of pre-processing operations may be performed on all (or some) of the items described herein.

In some implementations, the translation platform may convert a multimedia file to a set of frames. For example, the historical data may include a multimedia file that captures a video depicting one or more gestures, and the translation platform may convert the multimedia file to a set of frames for further processing. Additionally, or alternatively, the historical data may include an image file that captures an image depicting one or more gestures. In this case, the image file may be said to be a frame that includes the image and may be in a format suitable for further processing.

Additionally, or alternatively, the translation platform may identify one or more gestures within a frame. For example, the frame may be of an image and may include image data (e.g., pixels) depicting the one or more gestures, and other image data depicting things other than the one or more gestures (e.g., other body parts of the individual making the gesture, other objects near the individual, and/or the like). In this case, the translation platform may use a computer vision technique, an object recognition technique, and/or a similar technique to analyze the frame and to identify the image data depicting the one more gestures. As an example, an object recognition technique may be configured to identify a shape of a human hand, and the translation platform may use the object recognition technique to identify the image data of the frame that depicts the human hand (e.g., which may be performing a gesture). In some cases, the translation platform may perform additional pre-processing operations prior to identifying the one or more gestures and may identify the one or more gestures using a contouring technique, as described further herein.

Additionally, or alternatively, the translation platform may standardize a frame to a uniform format. For example, the translation platform may use a computer vision technique, an image rescaling technique, and/or a similar type of technique to convert the frame to a uniform file size, uniform file format, uniform resolution, and/or the like. In this way, the translation platform may receive historical data that includes frames that are of different formats and may convert the frames to the uniform format for further processing.

Additionally, or alternatively, the translation platform may reduce or remove image detail included in a frame. For example, the translation platform may perform a digital filtering technique (e.g., a median filtering technique, a Gaussian filtering technique, and/or the like) to filter the frame in a manner that reduces image detail, such as by reducing a resolution of the image data included in the frame. In some cases, the resolution may be reduced such that outlines of the one or more gestures are still identifiable. In this way, the translation platform conserves resources that would otherwise be wasted training the data model using frames that include complete (e.g., non-reduced) image detail (e.g., even when certain image details are not needed to perform the matching technique).

Additionally, or alternatively, the translation platform may perform a conversion technique to eliminate one or more colors from the image data included in a frame. For example, the translation platform may convert a first frame that includes reduced image detail (e.g., as described above) to a second frame that includes modified image data identifying a grayscale or a black and white depiction of the one or more gestures. In this case, the translation platform may perform a color conversion technique to convert the image data with the reduced image detail (e.g., which may include pixels representing colors of a Red-Green-Blue (RGB) color scheme) to the modified image data (e.g., which may include pixels representing grayscale or black and white colors).

Additionally, or alternatively, the translation platform may identify a gesture using a contouring technique. For example, the translation platform may perform a contouring technique to analyze the modified image data included within the frame and to identify boundaries of regions associated with the modified image data. As a particular example, different shades of black and white may be included as part of the modified image data and the translation platform may identify a gesture by identifying a particular shade of black and white or grayscale that is associated with skin tone of an individual. In some cases, the contouring technique may be combined with one or more other techniques described above, For example, the translation platform may use the contouring technique to identify areas of the image that include a human body part (e.g., hands, a face, a neck, etc.) and may use the computer vision technique and/or object recognition technique to identify which of the areas that include human body parts include hands (e.g., which are likely to be making gestures representing signs in a sign language).

In some implementations, the translation platform may generate a set of graphical representations of the set of gestures depicted by the image data. For example, the translation platform may analyze image data depicting a gesture to generate a histogram. In this case, the histogram may represent a distribution of tones and/or shades of color. For example, the histogram may have an X-axis representing a grayscale value (or a black or white value) indicating a particular shade or tone of gray (or of black or white) and may have a Y-axis value representing a frequency at which the grayscale value (or the black or white value) occurred within the image data.

In some implementations, the translation platform may use a data structure to establish associations between the set of graphical representations of the gestures, the image data depicting the gestures, and/or the text data describing the meanings conveyed by the gestures. For example, the translation platform may associate an identifier of the graphical representation of a gesture with an identifier that represents a storage location of an image depicting the gesture, with an identifier that represents a storage location of text describing the meaning conveyed by the gesture (or with the actual text), and/or the like. In this way, the translation platform is able to reference the data structure when performing the matching technique, as described further herein.

In some cases, the data structure may associate graphical representations of gestures with image data depicting variations of the gestures across multiple sign languages, and/or with text data describing the meaning conveyed by the gestures in multiple written or spoken languages. For example, an identifier of a graphical representation of a gesture may be stored in association with identifiers that indicate storage locations for images that depict variations of a sign across multiple sign languages (e.g., ASL, ISL, and/or the like), identifiers that indicate storage locations for text describing the meaning conveyed by the signs in multiple written or spoken languages (e.g., English, Hindi, Spanish, and/or the like), and/or the like.

In some implementations, the translation platform may generate a set of features to use to train a data model (e.g., a gesture recognition model, a predictive model, etc.). For example, the translation platform may generate a set of graphical representations of a set of gestures (e.g., such that there are graphical representations of all (or some) variations of gestures depicted by frames included within the historical data). In this case, the translation platform may analyze the set of graphical representations (e.g., histograms) to identify features that indicate a likelihood of a particular graphical representation being a particular gesture, to identify common features between particular graphical representations of gestures, and/or the like. The features may include a feature identifying a particular tone or shade of color, a feature identifying a frequency of the particular tone or shade of color, and/or the like. As an example, a gesture for a sign that conveys a particular message (e.g., "Hi") may be associated with a particular distribution of tones and/or shades of grayscale tones (or black and white tones) that have been captured by a histogram. This may allow the gesture management platform to identify that particular distribution of tones and/or shades of color as being a feature that is indicative of the particular message.

In some implementations, the translation platform may train a gesture recognition model. For example, the translation platform may use the set of features to train a gesture recognition model (e.g., using a model generation tool, such as Keras) to perform the matching technique. In this case, the translation platform may train the gesture recognition model to receive a graphical representation of a gesture as input, to analyze the graphical representation of the gesture to identify one or more patterns or features associated with the graphical representation, and to reference the data structure to select a graphical representation of a corresponding gesture that matches with the first graphical representation.

In some implementations, the translation platform may train a predictive model. For example, the translation platform may use the set of features to train a predictive model that is able to receive a graphical representation of a gesture as input and to select a graphical representation of a corresponding gesture, even if the graphical representation of the corresponding gesture is not a direct match. In some cases, the translation platform may train the predictive model to select the graphical representation of the corresponding gesture based on the graphical representation of the corresponding gesture satisfying a threshold level of similarity with the graphical representation of the gesture received as input. In this way, the translation platform may use the predictive model to predict what gesture an individual intended to make even when the individual made a slightly different gesture (e.g., an individual who is learning a sign language may not make a gesture that is a standard representation of a particular sign).

In some implementations, the translation platform may train a data model (e.g., the gesture recognition model, the predictive model, etc.) to make selections and/or predictions associated with bi-directional translation. For example, as described above, to use the data model to perform an image-to-text translation, the translation platform may train the data model to receive a graphical representation of one or more gestures as input and to use the matching technique to identify a graphical representation of one or more corresponding gestures (e.g., which may be stored in association with text indicating a meaning conveyed by the one or more gestures). Additionally, or alternatively, to use the data model (or a new data model) to perform a text-to-image translation, the translation platform may train the data model (or the new data model) to receive text describing a meaning conveyed by a word or phrase as input and to use the matching technique to identify corresponding text (e.g., which may be stored in association with image data depicting the gesture, an identifier of the image data depicting the gesture, and/or the like).

In some implementations, another device may train the data model and may provide a trained data model to the translation platform. For example, a device associated with a software developer (e.g., a desktop computer, a laptop computer, a server device, etc.) may be used to obtain the historical data, to train the data model, and to send the trained data model to the translation platform.

In this way, the translation platform trains (or obtains) a data model that can perform a matching technique that is to be used as part of the gesture translation service, as described further herein.

As shown in FIG. 1B, and by reference number 115, the user device may capture an image or a video of one or more gestures. For example, an individual may use the user device to access an application that provides the gesture translation service. This may allow the individual to communicate with another individual who is communicating in a sign language. In this case, the individual may interact with the user device to capture an image, a collection of images, or a video that depicts one or more gestures that represent one or more signs of the sign language.

The application may be hosted on the user device (e.g., as a mobile application for a smart phone, etc.) and/or may be accessible via the user device by visiting a website. The gesture translation service may provide bi-directional translation (e.g., image-to-text translation, text-to-image translation, and/or the like), multi-language translation (e.g., translation of an image in a first sign language (e.g., ASL, ISL) to text of a first written and/or spoken language (Hindi, English, etc.)), peer-to-peer device translation, and/or the like, each as described further herein.

In some implementations, the application may prompt the individual to take a still image or to begin recording a video session, and the individual may interact with an interface of the user device to take the still image or to begin recording the video session. In other cases, the individual may capture the one or more gestures using a camera feature of the user device and may upload an image or a video captured by the camera feature to the application. In the example shown, the user device may capture an image that depicts hands that are making a sign that represents the word "Hi."

As shown by reference number 120, the user device may provide a request for the gesture translation service to the translation platform. For example, when the individual interacts with the user device to capture the image or the video of the one or more gestures, the application may be configured to provide a request for the gesture translation service to the translation platform. The request may include the image data or multimedia data that depicts the one or more gestures, a service identifier indicating a type of gesture translation service (e.g., image-to-text translation, text-to-image translation, and/or the like), and/or the like.

As shown by reference number 125, the translation platform may select a type of gesture translation service. For example, the translation platform may select a type of gesture translation service based on data included in the request. The type of gesture translation service may be a first type of translation involving image-to-text translation, a second type of translation involving video-to-text translation, a third type of translation involving text-to-image translation, a fourth type of translation involving audio-to-image translation, and/or the like.

As an example, the translation platform may select the type of gesture translation based on a service identifier included in the request. In this example, the individual may interact with a menu displayed on an interface of the user device to select a service providing image-to-text translation, and may capture an image or a video of one or more gestures. In this case, a request may be generated and provided to the translation platform that includes the image or the video and a service identifier associated with the image-to-text translation. This may allow the translation platform to process the request to obtain the service identifier and to select the image-to-text translation as the type of gesture translation service.

As another example, the translation platform may analyze the data provided by the user device to identify a data type and may select the type of gesture translation service based on the data type. As an example, if the individual is seeking an image-to-text translation, the data received by the translation platform will be image data. Conversely, if the individual is seeking a text-to-image translation, the data provided to the translation platform will be text data, thereby allowing the translation platform to identify and select the type of gesture translation service based on the data type of the data received from the user device.

As shown by reference number 130, the translation platform may perform one or more pre-processing operations and may generate one or more graphical representations of the one or more gestures. For example, the translation platform may receive a multimedia file. In this case, the translation platform may convert the multimedia file to a first set of frames. Additionally, the translation platform may filter the first set of frames to reduce image detail (e.g., resolution, etc.) and may convert the first set of frames to a second set of frames that includes modified image data identifying a grayscale or black and white depiction of the one or more gestures. Furthermore, the translation platform may generate one or more graphical representations of the one or more gestures by analyzing the modified image data. Details of one or more of these steps are provided elsewhere herein.

In some implementations, one or more of the pre-processing operations may be performed by the user device. For example, the user device may convert the multimedia file to the first set of frames, may filter the first set of frames, may convert the first set of frames to the second set of frames, and/or the like. This conserves network resources by reducing a file size that needs to be transmitted via a network, as well as by reducing a processing load on one or more translation platform servers.

In this way, the translation platform generates graphical representations of the one or more gestures which may be used as part of the image-to-text translation, as described further herein.

As shown in FIG. 1C, and by reference number 135, the translation platform may use the data model to select a graphical representation of one or more corresponding gestures (i.e., gestures that correspond to the one or more gestures depicted by the image data or multimedia data received from the user device). For example, the translation platform may provide the one or more graphical representations of the one or more gestures as input to the data model. This may cause the data model to output one or more values that are used to select the graphical representation of the one or more corresponding gestures. In this case, the data model may be used to compare features associated with the one or more graphical representations of the one or more gestures and features associated with the set of graphical representations of the set of historical gestures (e.g., that represent signs for the sign language).

Additionally, the translation platform may select a graphical representation of one or more corresponding gestures that matches or satisfies a threshold level of similarity with the one or more graphical representations of the one or more gestures. For example, translation platform may use the data model to generate scores that represent a degree of similarity between the one or more graphical representations of the one or more gestures and each of the set of graphical representations of the set of gestures (e.g., which were included in the historical data used to train the data model). The degree of similarity may be based on attributes of the graphical representations (e.g., an overlap of a particular frequency or distribution of pixels), based on features used to train the data model, and/or the like. This may allow the translation platform to select the graphical representation that has a best-available score. For example, the translation platform may select a graphical representation of a gesture that matches at least one of the graphical representations of the one or more gestures, that satisfies a threshold level of similarity with the graphical representations of the one or more gestures, and/or the like. In some cases, the translation platform may select an identifier of the graphical representation of the gesture that has the best-available score (e.g., which may be used to identify response data to be used for the gesture translation service, as described below).

In the example shown in FIG. 1C, the translation platform may provide a first histogram as input to the data model. This may cause the data model to compare the first histogram and a set of histograms that represent signs of a sign language. Additionally, the data model may generate scores for the set of histograms based on a degree to which the set of histograms match with or satisfy a threshold level of similarity with the first histogram. As shown as an illustrative example, a second, third, and fourth histogram may be part of the set of histograms and may represent signs for the written or spoken words "Sorry," "Thank you," and "Hi." In this example, the translation platform may use the data model to generate scores for each of these histograms and may select the fourth histogram that represents the written or spoken word "Hi" (e.g., based on the fourth histogram matching or satisfying the threshold level of similarity with the first histogram.

In some implementations, the translation platform may use the prediction model only if the gesture recognition model is unable to identify a matching graphical representation of one or more corresponding gestures. For example, the translation platform may use the gesture recognition model to select the graphical representation of the one or more corresponding gestures. In this case, the translation platform may use the prediction model only if the gesture recognition model does not identify a matching graphical representation of one or more corresponding gestures. This conserves resources (e.g., processing resources, network resources, and/or the like) relative to always processing data with the prediction model.

Additionally, in some cases, the translation platform may use the prediction model to predict a type of sign language that is being used. For example, the translation platform may predict a type of sign language based on a location of the user device, based on a type of gesture (e.g., a particular gesture or hand motion might be used exclusively for a particular sign language), and/or the like. In other cases, the user device may provide an identifier indicating a type of sign language (e.g., when providing the request).

As shown by reference number 140, the translation platform may identify response data that is representative of the one or more corresponding gestures. For example, the translation platform may have access to a data structure that associates a first set of identifiers associated with the set of graphical representations of the set of gestures with text data describing a meaning conveyed by the set of gestures. In this case, the translation platform may use an identifier associated with the graphical representation of the one or more corresponding gestures to search the data structure for the text that is stored in association with the identifier. In the example shown, the translation platform may use ID_3 to search the data structure to identify text data for the term "Hi" (which represents the meaning conveyed by the one or more corresponding gestures).

In some implementations, the data structure may associate the first set of identifiers with one or more other sets of identifiers that are used as storage locations for data describing or depicting the meaning conveyed by the set of gestures. As an example, the translation platform may receive a request for a text-to-image translation service. In this example, the request may include text data of a particular word or phrase (e.g., the word "Hi") and the translation platform may use the matching technique to identify a corresponding word or phrase stored via the data structure. In this case, the translation platform may use a first identifier of the corresponding word or phrase to search the data structure for a second identifier indicating a storage location of image data depicting one or more gestures used to convey the particular word or phrase in a sign language. The image data may be used as response data that satisfies the request for the text-to-image translation service.

As shown by reference number 145, the translation platform may provide the user device with the response data. For example, the translation platform may provide the response data to the application that provides the gesture translation service (e.g., which may be hosted on the user device or accessible by the user device).

As shown by reference number 150, the user device may display the response data. For example, the user device may provide the response data (e.g., the text "Hi") for display via an interface of the application that provides the gesture translation service. In some implementations, the user device may convert the response data from a first format to a second format. For example, the user device may receive text and may convert the text to audio. This may allow the application to broadcast the audio for the individual.

In some implementations, the translation platform may provide a multi-language gesture translation service. For example, the translation platform may receive data depicting a sign in a first sign language (e.g., an American Sign Language (ASL), an Indian Sign Language (ISL), etc.) and may translate the data depicting the sign to a first written or spoken language (e.g., Hindi, English, etc.). In this case, the data model may be trained to recognize graphical representations of a corresponding sign, and the data structure may associate the graphical representations of the corresponding sign with text conveying a meaning of the corresponding sign in multiple languages, with identifiers of storage locations of the text, and/or the like.

By providing a multi-language gesture translation service, the translation platform allows individuals to communicate in a variety of different languages. This conserves resources (e.g., processing resources, network resources, and/or the like) relative to an inferior solution that is unable to provide the multi-language gesture translation service. For example, the inferior solution may use specialized hardware equipment (e.g., sensory gloves) to translate a sign in ASL to text in English describing a meaning conveyed by the sign. However, if the recipient that is viewing an image of the sign does not speak English, that individual may need to use a separate device to access a separate translation service to convert the English text to another language. This wastes processing resources of the separate device and/or resources of the separate translation service and may provide an ineffective solution if the translation is not accurate.

Additionally, or alternatively, the translation platform may support gesture translation services for peer-to-peer devices. For example, a first individual who communicates using a first language (e.g., a sign language) may have a first user device, and a second individual who communicates using a second language (e.g., a different sign language, a spoken or written language, etc.) may have a second user device. In this case, the first user device and the second user device may use the application to establish a communication session with each other. Additionally, the first user device and the second user device may communicate with each other by relying on the translation platform to provide gesture translation services. Peer-to-peer sessions may be helpful when one or more individuals are learning a sign language, are not physically present near each other, and/or the like.

As an example, the first individual may use the first user device to capture a video or an image of a sign (e.g., using a camera of the first user device) which may cause the video or the image to be provided to the translation platform. In this case, the translation platform may use one or more techniques described herein to identify text describing a meaning conveyed by a corresponding sign and may provide the text for display on an interface of the second user device. The second individual may respond in a similar manner (e.g., by capturing a video or an image of a sign and causing the first user device to be provided with text describing the meaning conveyed by a corresponding sign). Additionally, or alternatively, the second individual may type out a response message using the interface of the second user device, which may cause text data to be provided to the translation platform. In this case, the translation platform may use one or more techniques described herein to identify an image depicting a sign that corresponds to the text and may provide the image for display on the first user device.

In some implementations, the application that provides the gesture translation service may be supported entirely by the user device. For example, the application may be installed onto the user device and may enable the user device to provide an offline gesture translation service (e.g., a gesture translation service that does not require connecting to a network, that does not require interacting with the translation platform, etc.). In this case, when the application is installed, the user device may be configured with the trained data model and the data structure as described elsewhere herein. In some cases, the user device may be configured with a lightweight trained data model and/or data structure (e.g., that may not take up as much memory and/or utilize as much computing power as the trained data model and data structure that is described elsewhere herein). This allows the user device to provide the gesture translation service even without access to a network (e.g., the Internet), thereby conserving network resources that would otherwise be used to send and/or receive data between the user device and the translation platform.

In this way, the translation platform (or the user device) provides real-time bi-directional translation of gestures (e.g., gestures depicting signs) that allow individuals who do not understand sign language (or do not understand a particular sign language) to communicate with individuals who rely on sign language (or the particular sign language) as a primary mode of communication. Furthermore, the translation platform provides real-time bi-directional translation of gestures in a way that efficiently and effectively utilizes resources (e.g., processing resources, network resources, and/or the like). For example, by modifying images in a manner that reduces image detail (e.g., resolution, color, etc.) and generating graphical representations based on the images that have been modified, the translation platform conserves resources relative to a solution that has to process three-dimensional (3-D) images and/or two-dimensional (2-D) images that do not have reduced image detail.

As indicated above, FIGS. 1A-1C are provided merely as an example. Other examples may differ from what was described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple and/or distributed devices. Additionally, or alternatively, a set of devices (e.g., one or more devices) of example implementation 100 may perform one or more functions described as being performed by another set of devices of example implementation 100.

Figure 2:
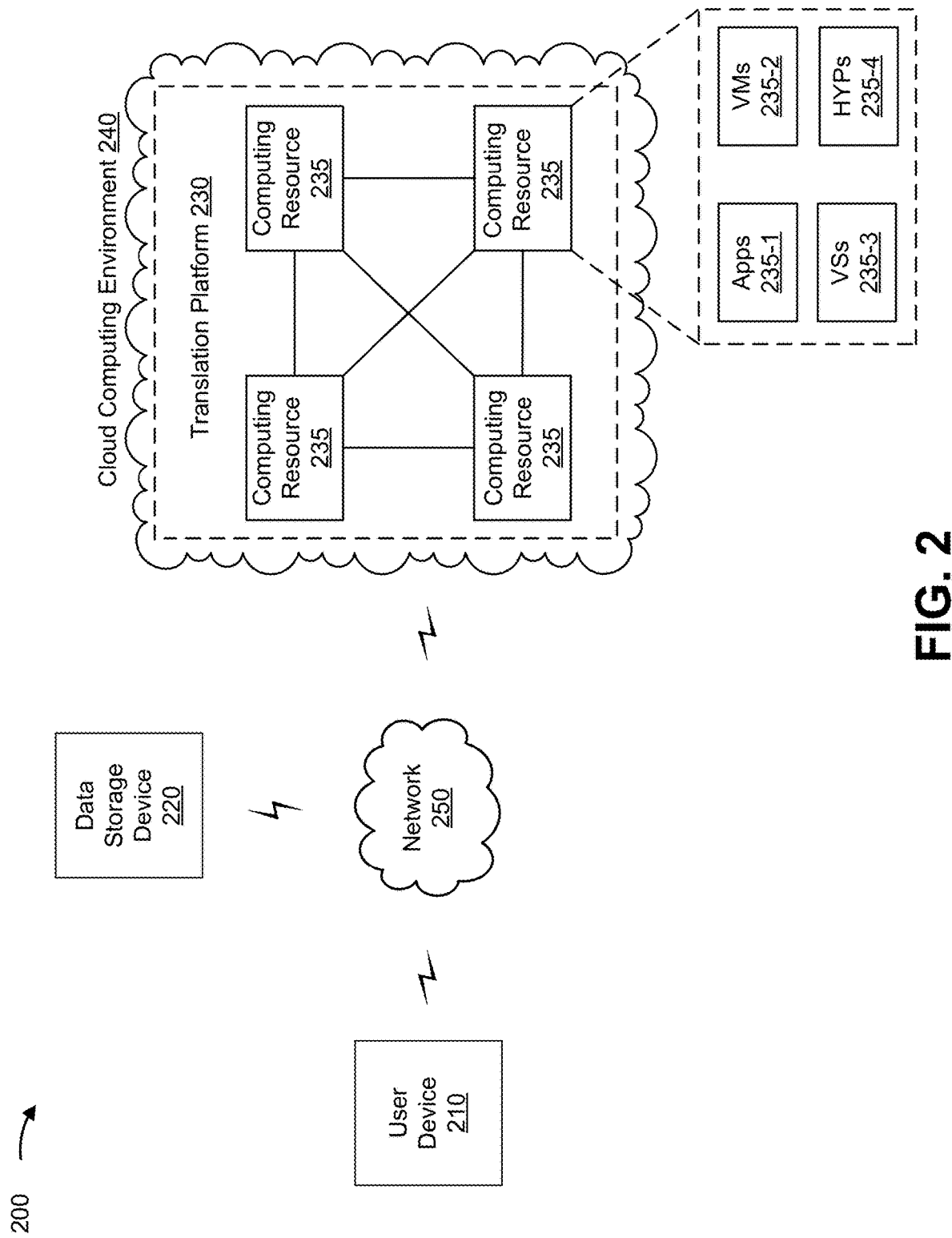
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a data storage device 220, a translation platform 230 hosted within a cloud computing environment 240, and/or a network 250. Devices of environment 200 may interconnect via wired connections, wireless connections, or a combination of wired and wireless connections.

User device 210 includes one or more devices capable of receiving, generating, storing, processing, and/or providing information associated with a gesture translation service. For example, user device 210 may include a device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may host or have access to an application that provides the gesture translation service. In some implementations, user device 210 may support a version of the application that provides the gesture translation service without requiring access to network 250 (e.g., the Internet).

In some implementations, user device 210 may provide a request associated with the gesture translation service to translation platform 230. The request may include data that depicts one or more gestures (e.g., image data, multimedia data, etc.), data that describes a meaning conveyed by one or more gestures (e.g., text data, audio data, etc.), and/or the like. In some implementations, user device 210 may receive response data from translation platform 230. The response data may be part of the gesture translation service and may include data that describes the meaning conveyed by the one or more gestures (e.g., text data, audio data, etc.), data that depicts the one or more gestures (e.g., image data, multimedia data, etc.), and/or the like. In some implementations, a first user device 210 may use the application to communicate with a second user device 210 (e.g., by utilizing translation platform 230 for the gesture translation service).

Data storage device 220 includes one or more devices capable of receiving, storing, generating, determining, and/or providing historical data associated with the gesture translation service. For example, data storage device 220 may include a server device or a group of server devices. In some implementations, data storage device 220 may use a data structure to store historical data (e.g., as defined elsewhere herein) that depicts or describes a set of gestures associated with one or more sign languages. In some implementations, data storage device 220 may provide the historical data to translation platform 230.

Translation platform 230 includes one or more devices capable of receiving, storing, processing, generating, determining, and/or providing information associated with the gesture translation service. For example, translation platform 230 may include a server device (e.g., a host server, a web server, an application server, etc.), a data center device, or a similar device. In some implementations, translation platform 230 may perform actions to provide user device 210 with the gesture translation service (e.g., as described elsewhere herein).

In some implementations, as shown, translation platform 230 may be hosted in cloud computing environment 240. Notably, while implementations described herein describe translation platform 230 as being hosted in cloud computing environment 240, in some implementations, translation platform 230 may not be cloud-based (i.e., may be implemented outside of a cloud computing environment) or may be partially cloud-based.

Cloud computing environment 240 includes an environment that hosts translation platform 230. Cloud computing environment 240 may provide computation, software, data access, storage, etc. services that do not require end-user knowledge of a physical location and configuration of system(s) and/or device(s) that hosts translation platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host translation platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or data storage device 220. Application 235-1 may eliminate a need to install and execute the software applications on these devices. For example, application 235-1 may include the application that provides the gesture translation service to user device 210 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
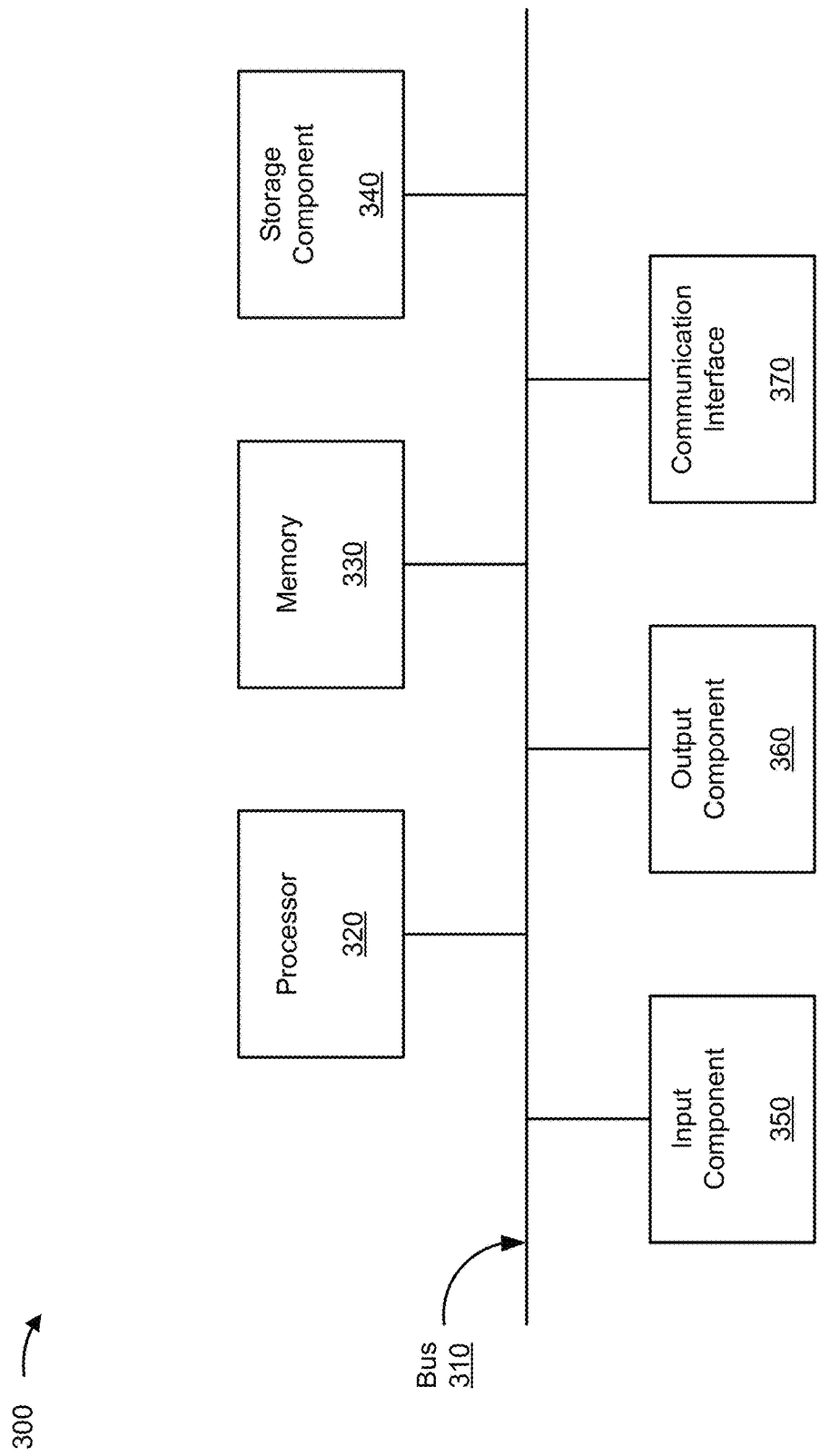
FIG. 3 is a diagram of example components of one or more devices of FIG. 2.

FIG. 3 is a diagram of example components of a device 300. Device 300 may correspond to user device 210, data storage device 220, and/or translation platform 230. In some implementations, user device 210, data storage device 220, and/or translation platform 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
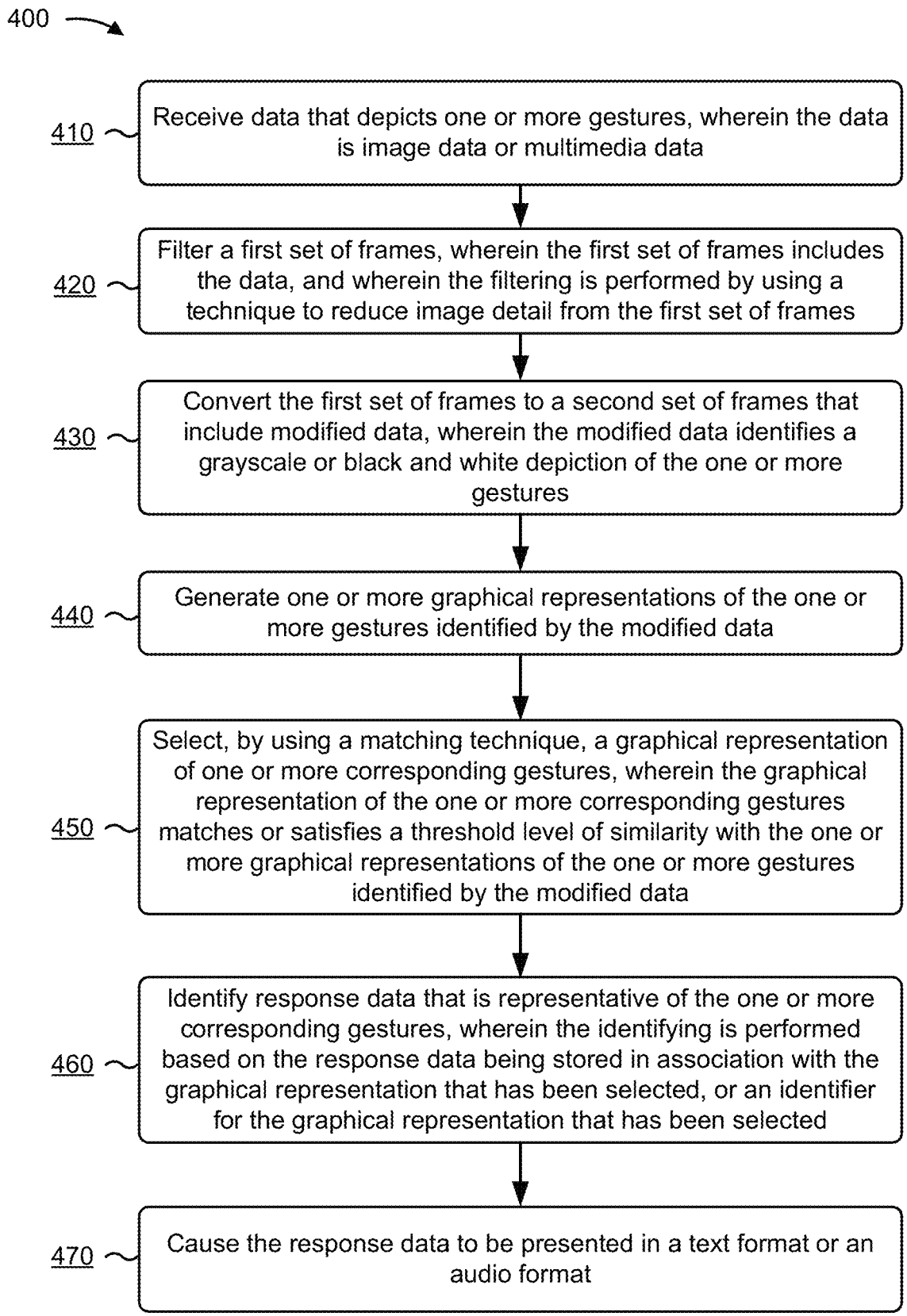
FIGS. 4-6 are flow charts of an example process for translating data from a first language (e.g., a sign language, a written or spoken language, etc.) to a second language (e.g., the written or spoken language, the sign language, etc.).

FIG. 4 is a flow chart of an example process 400 for translating data from a first language (e.g., a sign language, a written or spoken language, etc.) to a second language (e.g., the written or spoken language, the sign language, etc.). In some implementations, one or more process blocks of FIG. 4 may be performed by a translation platform (e.g., translation platform 230). In some implementations, one or more process blocks of FIG. 4 may be performed by another device or a group of devices separate from or including the translation platform, such as a user device (e.g., user device 210), a data storage device (e.g., data storage device 220), and/or the like.

As shown in FIG. 4, process 400 may include receiving data that depicts one or more gestures, wherein the data is image data or multimedia data (block 410). For example, the translation platform (e.g., using computing resource 235, processor 320, memory 330, storage component 340, input component 350, communication interface 370, and/or the like) may receive, as part of a gesture translation service, data that depicts one or more gestures, as described above. In some implementations, the data may be image data or multimedia data.

As further shown in FIG. 4, process 400 may include filtering a first set of frames that include the data by using a filtering technique to reduce image detail from the first set of frames (block 420). For example, the translation platform (e.g., using computing resource 235, processor 320, memory 330, storage component 340, and/or the like) may filter a first set of frames that include the data by using a filtering technique to reduce image detail from the first set of frames, as described above.

As further shown in FIG. 4, process 400 may include converting the first set of frames to a second set of frames that include modified data identifying a grayscale or black and white depiction of the one or more gestures (block 430). For example, the translation platform (e.g., using computing resource 235, processor 320, memory 330, storage component 340, and/or the like) may convert the first set of frames to a second set of frames that include modified data identifying a grayscale or black and white depiction of the one or more gestures, as described above.

As further shown in FIG. 4, process 400 may include generating one or more graphical representations of the one or more gestures identified by the modified data (block 440). For example, the translation platform (e.g., using computing resource 235, processor 320, memory 330, storage component 340, and/or the like) may generate one or more graphical representations of the one or more gestures identified by the modified data, as described above.

As further shown in FIG. 4, process 400 may include selecting, by using a matching technique, a graphical representation of one or more corresponding gestures, wherein the graphical representation of the one or more corresponding gestures matches or satisfies a threshold level of similarity with the one or more graphical representations of the one or more gestures identified by the modified data (block 450). For example, the translation platform (e.g., using computing resource 235, processor 320, memory 330, storage component 340, and/or the like) may select, by using a matching technique, a graphical representation of one or more corresponding gestures, as described above. In some implementations, the graphical representation of the one or more corresponding gestures may match or satisfy a threshold level of similarity with the one or more graphical representations of the one or more gestures identified by the modified data.

As further shown in FIG. 4, process 400 may include identifying response data that is representative of the one or more corresponding gestures based on the response data being stored in association with the graphical representation that has been selected or an identifier for the graphical representation that has been selected (block 460). For example, the translation platform (e.g., using computing resource 235, processor 320, memory 330, storage component 340, and/or the like) may identify response data that is representative of the one or more corresponding gestures based on the response data being stored in association with the graphical representation that has been selected or an identifier for the graphical representation that has been selected, as described above.

As further shown in FIG. 4, process 400 may include causing the response data to be presented in a text format or an audio format (block 470). For example, the translation platform (e.g., using computing resource 235, processor 320, memory 330, storage component 340, output component 360, communication interface 370, and/or the like) may cause, as part of the gesture translation service, the response data to be presented in a text format or an audio format, as described above.

Process 400 may include additional implementations, such as any single implementation or any combination of implementations described below and/or in connection with one or more other processes described elsewhere herein.

In some implementations, the one or more corresponding gestures may represent one or more signs that are part of a sign language. In some implementations, the data that depicts the one or more gestures may be associated with a first written and/or spoken language or a first sign language and the response data for the one or more corresponding gestures may be associated with a second sign language or a second written and/or spoken language. In some implementations, when filtering the first set of frames, the translation platform may filter a frame, of the first set of frames, by performing the filtering technique to reduce a resolution of the frame identifying the one or more gestures.

In some implementations, when converting the first set of frames to the second set of frames, the translation platform may perform a color conversion technique to convert a frame, of the first set of frames, to a frame of the second set of frames that include the modified data identifying the grayscale or the black and white depiction of the one or more gestures, and may perform a contouring technique to identify boundaries of regions associated with the modified data included in the frame of the second set of frames. Additionally, when generating the one or more graphical representations of the modified data, the translation platform may generate a histogram to serve as a particular graphical representation of the modified data that is included in the frame of the second set of frames.

In some implementations, when selecting the graphical representation of the one or more corresponding gestures, the translation platform may provide the one or more graphical representations of the modified data as input to a data model to cause the data model to output one or more values that are used to select the graphical representation of the one or more corresponding gestures. The data model may have been trained on historical data and may use one or more machine learning techniques to select the graphical representation of the one or more corresponding gestures based on the graphical representation matching, or satisfying the threshold level of similarity with the one or more graphical representations of the one or more gestures identified by the modified data.

In some implementations, a first part of the processing performed by the data model may involve identifying a type of sign language associated with the one or more gestures. For example, identifying the type of sign language may be based on location information of the user device that provided the data depicting the one or more gestures, an identifier provided in a request (as described elsewhere herein), and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
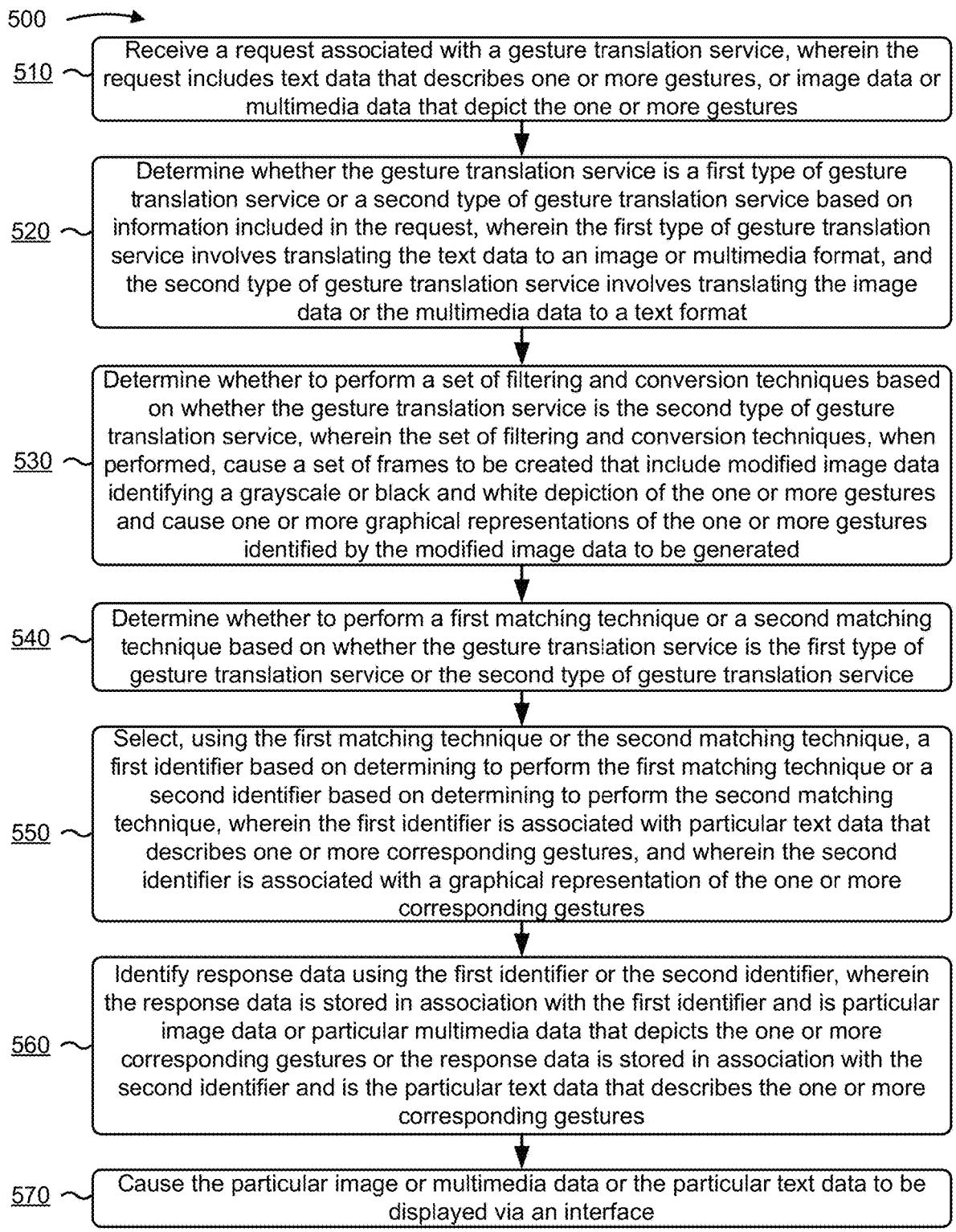

FIG. 5 is a flow chart of an example process 500 for translating data from a first language (e.g., a sign language, a written or spoken language, etc.) to a second language (e.g., the written or spoken language, the sign language, etc.). In some implementations, one or more process blocks of FIG. 5 may be performed by a device, such as a translation platform (e.g., translation platform 230). In some implementations, one or more process blocks of FIG. 5 may be performed by another device or a group of devices separate from or including the translation platform, such as a user device (e.g., user device 210), a data storage device (e.g., data storage device 220), and/or the like.

As shown in FIG. 5, process 500 may include receiving a request associated with a gesture translation service, wherein the request includes text data that describes one or more gestures, or image data or multimedia data that depict the one or more gestures (block 510). For example, the translation platform (e.g., using computing resource 235, processor 320, memory 330, storage component 340, input component 350, communication interface 370, and/or the like) may receive a request associated with a gesture translation service, as described above. In some implementations, the request may include text data that describes one or more gestures or image data or multimedia data that depict the one or more gestures.

As further shown in FIG. 5, process 500 may include determining whether the gesture translation service is a first type of gesture translation service or a second type of gesture translation service based on information included in the request, wherein the first type of gesture translation service involves translating the text data to an image or multimedia format, and the second type of gesture translation service involves translating the image data or the multimedia data to a text format (block 520). For example, the translation platform (e.g., using computing resource 235, processor 320, memory 330, storage component 340, and/or the like) may determine whether the gesture translation service is a first type of gesture translation service or a second type of gesture translation service based on information included in the request, as described above. In some implementations, the first type of gesture translation service may involve translating the text data to an image or multimedia format and the second type of gesture translation service may involve translating the image data or the multimedia data to a text format. In other cases, the first type of gesture translation service and/or the second type of gesture translation service may involve other types of translation (e.g., an audio-to-image translation, an image-to-audio translation, and/or the like).

As further shown in FIG. 5, process 500 may include determining whether to perform a set of filtering and/or conversion techniques based on whether the gesture translation service is the second type of gesture translation service, wherein the set of filtering and/or conversion techniques, when performed, cause a set of frames to be created that include modified image data identifying a grayscale or black and white depiction of the one or more gestures, and cause one or more graphical representations of the one or more gestures identified by the modified image data to be generated (block 530). For example, the translation platform (e.g., using computing resource 235, processor 320, memory 330, storage component 340, and/or the like) may determine whether to perform a set of filtering and/or conversion techniques based on whether the gesture translation service is the second type of gesture translation service, as described above. In some implementations, the set of filtering and/or conversion techniques, when performed, may cause a set of frames to be created that include modified image data identifying a grayscale or black and white depiction of the one or more gestures, and may cause one or more graphical representations of the one or more gestures identified by the modified image data to be generated.

As further shown in FIG. 5, process 500 may include determining whether to perform a first matching technique or a second matching technique based on whether the gesture translation service is the first type of gesture translation service or the second type of gesture translation service (block 540). For example, the translation platform (e.g., using computing resource 235, processor 320, memory 330, storage component 340, and/or the like) may determine whether to perform a first matching technique or a second matching technique based on whether the gesture translation service is the first type of gesture translation service or the second type of gesture translation service, as described above.

As further shown in FIG. 5, process 500 may include selecting, using the first matching technique or the second matching technique, a first identifier based on determining to perform the first matching technique, or a second identifier based on determining to perform the second matching technique, wherein the first identifier is associated with particular text data that describes one or more corresponding gestures, and wherein the second identifier is associated with a graphical representation of the one or more corresponding gestures (block 550). For example, the translation platform (e.g., using computing resource 235, processor 320, memory 330, storage component 340, and/or the like) may select, using the first matching technique or the second matching technique, a first identifier based on determining to perform the first matching technique or a second identifier based on determining to perform the second matching technique, as described above. In some implementations, the first identifier may be associated with particular text data that describes one or more corresponding gestures. In some implementations, the second identifier may be associated with a graphical representation of the one or more corresponding gestures.

As further shown in FIG. 5, process 500 may include identifying response data using the first identifier or the second identifier, wherein the response data is stored in association with the first identifier and is particular image data or particular multimedia data that depicts the one or more corresponding gestures, or the response data is stored in association with the second identifier and is the particular text data that describes the one or more corresponding gestures (block 560). For example, the translation platform (e.g., using computing resource 235, processor 320, memory 330, storage component 340, and/or the like) may identify response data using the first identifier or the second identifier, as described above. In some implementations, the response data may be stored in association with the first identifier and may be particular image data or particular multimedia data that depicts the one or more corresponding gestures. In some implementations, the response data may be stored in association with the second identifier and may be the particular text data that describes the one or more corresponding gestures.

As further shown in FIG. 5, process 500 may include causing the response data to be displayed via an interface (block 570). For example, the translation platform (e.g., using computing resource 235, processor 320, memory 330, storage component 340, output component 360, communication interface 370, and/or the like) may cause the response data to be displayed via an interface, as described above.

Process 500 may include additional implementations, such as any single implementation or any combination of implementations described below and/or in connection with one or more other processes described elsewhere herein.

In some implementations, the one or more gestures and the one or more corresponding gestures may represent one or more signs that are part of a sign language. In some implementations, the text data that describes the one or more gestures or the image data or the multimedia data that depict the one or more gestures may be associated with a first written language or a first sign language and the response data may be associated with a second sign language or a second written language. In some implementations, one or more (e.g., all) steps described as being performed by the translation platform may be performed by the user device.

In some implementations, when determining whether to perform the set of filtering and/or conversion techniques, the translation platform may determine to perform the set of filtering and/or conversion techniques based on determining that the gesture translation service is the second type of gesture translation service. In some implementations, the translation platform may filter an initial set of frames that include the image data to reduce a resolution of the initial set of frames. In some implementations, the translation platform may convert the initial set of frames that have been filtered to the set of frames that include the modified image data. In some implementations, the translation platform may generate one or more histograms as the one or more graphical representations of the modified image data.

In some implementations, when selecting the second identifier, the translation platform may provide the one or more graphical representations of the modified image data as input to a data model, to cause the data model to output one or more values that are used to select the second identifier that is associated with the graphical representation of the one or more corresponding gestures. The data model may have been trained on historical data and may use one or more machine learning techniques.

In some implementations, when receiving the request, the translation platform may receive the request from a first user device that has engaged in a peer-to-peer session with a second user device, and, when causing the response data to be displayed via the interface, the translation platform may provide the response data to be displayed via the interface on the second user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
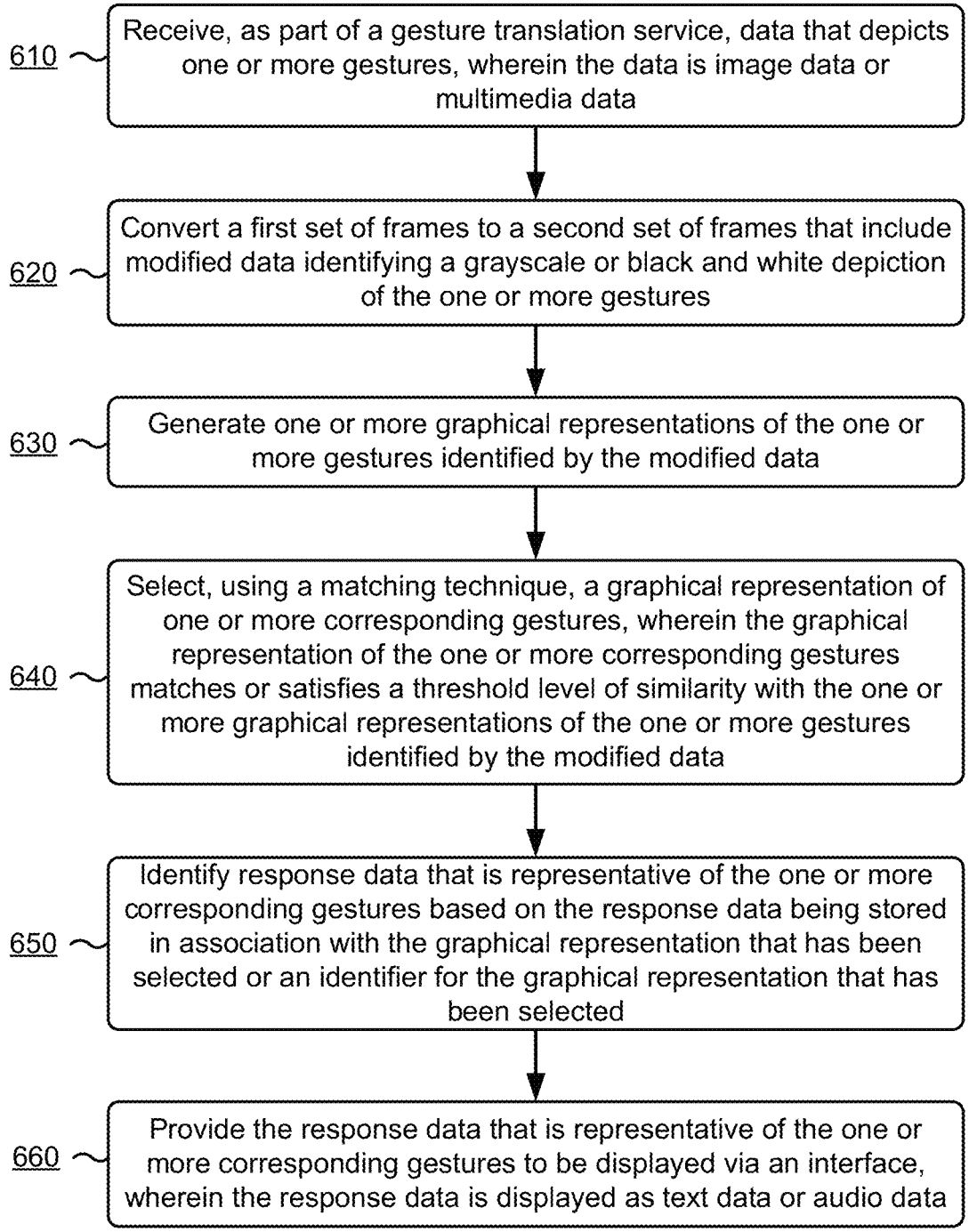

FIG. 6 is a flow chart of an example process 600 for translating data from a first language (e.g., a sign language, a written or spoken language, etc.) to a second language (e.g., the written or spoken language, the sign language, etc.). In some implementations, one or more process blocks of FIG. 6 may be performed by a device, such as a translation platform (e.g., translation platform 230). In some implementations, one or more process blocks of FIG. 6 may be performed by another device or a group of devices separate from or including the translation platform, such as a user device (e.g., user device 210), a data storage device (e.g., data storage device 220), and/or the like.

As shown in FIG. 6, process 600 may include receiving, as part of a gesture translation service, data that depicts one or more gestures, wherein the data is image data or multimedia data (block 610). For example, the translation platform (e.g., using computing resource 235, processor 320, memory 330, storage component 340, input component 350, communication interface 370, and/or the like) may receive, as part of a gesture translation service, data that depicts one or more gestures, as described above.

As further shown in FIG. 6, process 600 may include converting a first set of frames to a second set of frames that include modified data identifying a grayscale or black and white depiction of the one or more gestures (block 620). For example, the translation platform (e.g., using computing resource 235, processor 320, memory 330, storage component 340, and/or the like) may convert a first set of frames to a second set of frames that include modified data identifying a grayscale or black and white depiction of the one or more gestures, as described above.

As further shown in FIG. 6, process 600 may include generating one or more graphical representations of the one or more gestures identified by the modified data (block 630). For example, the translation platform (e.g., using computing resource 235, processor 320, memory 330, storage component 340, and/or the like) may generate one or more graphical representations of the one or more gestures identified by the modified data, as described above.

As further shown in FIG. 6, process 600 may include selecting, using a matching technique, a graphical representation of one or more corresponding gestures, wherein the graphical representation of the one or more corresponding gestures matches or satisfies a threshold level of similarity with the one or more graphical representations of the one or more gestures identified by the modified data (block 640). For example, the translation platform (e.g., using computing resource 235, processor 320, memory 330, storage component 340, and/or the like) may select, using a matching technique, a graphical representation of one or more corresponding gestures, as described above. In some implementations, the graphical representation of the one or more corresponding gestures may match or satisfy a threshold level of similarity with the one or more graphical representations of the one or more gestures identified by the modified data.

As further shown in FIG. 6, process 600 may include identifying response data that is representative of the one or more corresponding gestures based on the response data being stored in association with the graphical representation that has been selected, or an identifier for the graphical representation that has been selected (block 650). For example, the translation platform (e.g., using computing resource 235, processor 320, memory 330, storage component 340, and/or the like) may identify response data that is representative of the one or more corresponding gestures based on the response data being stored in association with the graphical representation that has been selected or an identifier for the graphical representation that has been selected, as described above.

As further shown in FIG. 6, process 600 may include providing the response data that is representative of the one or more corresponding gestures to be displayed via an interface, wherein the response data is displayed as text data or audio data (block 660). For example, the translation platform (e.g., using computing resource 235, processor 320, memory 330, storage component 340, output component 350, communication interface 370, and/or the like) may provide the response data that is representative of the one or more corresponding gestures to be displayed via an interface, as described above. In some implementations, the response data may be displayed as text data or audio data.

Process 600 may include additional implementations, such as any single implementation or any combination of implementations described below and/or in connection with one or more other processes described elsewhere herein.

In some implementations, the one or more gestures and the one or more corresponding gestures may represent one or more signs in a sign language. In some implementations, the data that depicts the one or more gestures may be associated with a first spoken language or a first sign language, and the response data that is representative of the one or more corresponding gestures may be associated with a second sign language or a second spoken language.

In some implementations, one or more of the steps described above may be performed by the user device. In this case, one or more processors of the user device may receive the data that depicts the one or more gestures from an image capturing component of the user device. The data may represent a two-dimensional (2-D) depiction of the one or more gestures.

In some implementations, the translation platform may filter, after receiving the data that depicts the one or more gestures, a first set of frames that include the data by using a filtering technique to reduce image detail from the first set of frames.

In some implementations, when selecting the graphical representation of the one or more corresponding gestures, the translation platform may provide the one or more graphical representations of one or more gestures identified by the modified data as input to a data model, to cause the data model to output one or more values that are used to select the graphical representation of the one or more corresponding gestures. The data model may have been trained on historical data and may use one or more machine learning techniques to select the graphical representation of the one or more corresponding gestures based on the graphical representation matching or satisfying a threshold level of similarity with the one or more graphical representations of the one or more gestures identified by the modified data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, data that depicts one or more gestures,
      wherein the data is image data or multimedia data;
   filtering, by the device, a first set of frames,
      wherein the first set of frames includes the data, and
      wherein the filtering is performed by using a technique to reduce image detail from the first set of frames;
   converting, by the device, the first set of frames to a second set of frames that include modified data,
      wherein the modified data identifies a grayscale or black and white depiction of the one or more gestures;
   generating, by the device, one or more graphical representations of the one or more gestures identified by the modified data;
   selecting, by the device and by using a matching technique, a graphical representation of one or more corresponding gestures,
      wherein the graphical representation of the one or more corresponding gestures matches or satisfies a threshold level of similarity with the one or more graphical representations of the one or more gestures identified by the modified data;
   identifying, by the device, response data that is representative of the one or more corresponding gestures,
      wherein the identifying is performed based on:
         the response data being stored in association with the graphical representation that has been selected, or
         an identifier for the graphical representation that has been selected; and
   causing, by the device, the response data to be presented in a text format or an audio format.

2. The method of claim 1, wherein the one or more corresponding gestures represent one or more signs that are part of a sign language.

3. The method of claim 1, wherein the data that depicts the one or more gestures is associated with a first written or spoken language or a first sign language, and the response data for the one or more corresponding gestures is associated with a second sign language or a second written or spoken language.

4. The method of claim 1, wherein filtering the first set of frames comprises:
   filtering a frame, of the first set of frames, by performing the filtering technique to reduce a resolution of the frame identifying the one or more gestures.

5. The method of claim 1, wherein converting the first set of frames to the second set of frames comprises:
   performing a color conversion technique to convert a frame, of the first set of frames, to a frame of the second set of frames that includes the modified data identifying the grayscale or the black and white depiction of the one or more gestures, and
   performing a contouring technique to identify boundaries of regions associated with the modified data included in the frame of the second set of frames; and
   wherein generating the one or more graphical representations of the modified data comprises:
      generating a histogram to serve as a particular graphical representation of the modified data that is included in the frame of the second set of frames.

6. The method of claim 1, wherein selecting the graphical representation of the one or more corresponding gestures comprises:
   providing the one or more graphical representations of the modified data as input to a data model to cause the data model to output one or more values that are used to select the graphical representation of the one or more corresponding gestures,
      wherein the data model has been trained on historical data and uses one or more machine learning techniques to select the graphical representation of the one or more corresponding gestures based on the graphical representation matching or satisfying the threshold level of similarity with the one or more graphical representations of the one or more gestures identified by the modified data.

7. The method of claim 6, wherein a first part of the processing performed by the data model involves identifying a type of sign language associated with the one or more gestures, and wherein identifying the type of sign language is based on location information of a user device that provided the data depicting the one or more gestures.

8. A device, comprising:
   one or more memories; and
   one or more processors, operatively coupled to the one or more memories, to:
      receive a request associated with a gesture translation service,
         wherein the request includes:
            text data that describes one or more gestures, or
            image data or multimedia data that depict the one or more gestures;
      determine whether the gesture translation service is a first type of gesture translation service or a second type of gesture translation service based on information included in the request,
         wherein:
            the first type of gesture translation service involves translating the text data to an image or multimedia format, and the second type of gesture translation service involves translating the image data or the multimedia data to a text format;
determine whether to perform a set of filtering and conversion techniques based on whether the gesture translation service is the second type of gesture translation service,
wherein the set of filtering and conversion techniques, when performed, cause a set of frames to be created that include modified image data identifying a grayscale or black and white depiction of the one or more gestures and cause one or more graphical representations of the one or more gestures identified by the modified image data to be generated;
determine whether to perform a first matching technique or a second matching technique based on whether the gesture translation service is the first type of gesture translation service or the second type of gesture translation service;
select, using the first matching technique or the second matching technique, a first identifier based on determining to perform the first matching technique or a second identifier based on determining to perform the second matching technique,
wherein the first identifier is associated with particular text data that describes one or more corresponding gestures, and
wherein the second identifier is associated with a graphical representation of the one or more corresponding gestures;
identify response data using the first identifier or the second identifier,
wherein the response data is stored in association with the first identifier and is particular image data or particular multimedia data that depicts the one or more corresponding gestures or the response data is stored in association with the second identifier and is the particular text data that describes the one or more corresponding gestures; and
cause the response data to be displayed via an interface.

9. The device of claim 8, wherein the one or more gestures and the one or more corresponding gestures represent one or more signs that are part of a sign language.

10. The device of claim 8, wherein the text data that describes the one or more gestures or the image data or multimedia data that depict the one or more gestures is associated with a first written language or a first sign language and the response data is associated with a second sign language or a second written language.

11. The device of claim 8, wherein the device is a user device or a server device.

12. The device of claim 8, wherein the one or more processors, when determining whether to perform the set of filtering and conversion techniques, are to:
determine to perform the set of filtering and conversion techniques based on determining that the gesture translation service is the second type of gesture translation service,
filter an initial set of frames that include the image data to reduce a resolution of the initial set of frames;
convert the initial set of frames that have been filtered to the set of frames that include the modified image data; and
generate one or more histograms as the one or more graphical representations of the modified image data.

13. The device of claim 8, wherein the one or more processors, when selecting the second identifier, are to:
provide the one or more graphical representations of the modified image data as input to a data model to cause the data model to output one or more values that are used to select the second identifier that is associated with the graphical representation of the one or more corresponding gestures,
wherein the data model has been trained on historical data and uses one or more machine learning techniques.

14. The device of claim 8, wherein the device is a server device; and wherein the one or more processors, when receiving the request, are to:
receive the request from a first user device that has engaged in a peer-to-peer session with a second user device; and
wherein the one or more processors, when causing the response data to be displayed via the interface, are to:
provide the response data to be displayed via the interface on the second user device.

15. A non-transitory computer-readable medium storing instructions, the instructions comprising:
one or more instructions that, when executed by one or more processors of a device, cause the one or more processors to:
receive, as part of a gesture translation service, data that depicts one or more gestures,
wherein the data is image data or multimedia data;
convert a first set of frames to a second set of frames that include modified data identifying a grayscale or black and white depiction of the one or more gestures;
generate one or more graphical representations of the one or more gestures identified by the modified data;
select, using a matching technique, a graphical representation of one or more corresponding gestures,
wherein the graphical representation of the one or more corresponding gestures matches or satisfies a threshold level of similarity with the one or more graphical representations of the one or more gestures identified by the modified data;
identify response data that is representative of the one or more corresponding gestures based on the response data being stored in association with the graphical representation that has been selected or an identifier for the graphical representation that has been selected; and
provide the response data that is representative of the one or more corresponding gestures to be displayed via an interface,
wherein the response data is displayed as text data or audio data.

16. The non-transitory computer-readable medium of claim 15, wherein the one or more gestures and the one or more corresponding gestures represent one or more signs in a sign language.

17. The non-transitory computer-readable medium of claim 15, wherein the data that depicts the one or more gestures is associated with a first spoken language or a first sign language, and the gesture data that is representative of the one or more corresponding gestures is associated with a second sign language or a second spoken language.

18. The non-transitory computer-readable medium of claim 15, wherein the device is a user device; and wherein the one or more instructions, that cause the one or more processors to receive the data, cause the one or more processors to:
- receive the data from an image capturing component of the user device,
  - wherein the data represents a two-dimensional (2-D) depiction of the one or more gestures.

19. The non-transitory computer-readable medium of claim 15, wherein the one or more instructions, when executed by the one or more processors, further cause the one or more processors to:
- filter, after receiving the data that depicts the one or more gestures, the first set of frames that include the data by using a filtering technique to reduce image detail from the first set of frames.

20. The non-transitory computer-readable medium of claim 15, wherein the one or more instructions, that cause the one or more processors to select the graphical representation of the one or more corresponding gestures, cause the one or more processors to:
- provide the one or more graphical representations of one or more gestures identified by the modified data as input to a data model to cause the data model to output one or more values that are used to select the graphical representation of the one or more corresponding gestures,
  - wherein the data model has been trained on historical data and uses one or more machine learning techniques to select the graphical representation of the one or more corresponding gestures based on the graphical representation matching or satisfying the threshold level of similarity with the one or more graphical representations of the one or more gestures identified by the modified data.

\* \* \* \* \*